(12) United States Patent
Liao et al.

(10) Patent No.: US 9,127,156 B2
(45) Date of Patent: Sep. 8, 2015

(54) FLAME-RETARDANT THERMOPLASTIC STARCH MATERIAL, FLAME-RETARDANT THERMOPLASTIC STARCH-BASED BIO-COMPOSITE, AND METHOD FOR MANUFACTURING THE SAME

(71) Applicant: INDUSTRIAL TECHNOLOGY RESEARCH INSTITUTE, Chutung, Hsinchu (TW)

(72) Inventors: Sheng-Ju Liao, Hsinchu (TW); Chih-Jen Chang, Toufen Township, Miaoli County (TW); Yao-Chu Chung, Kaohsiung (TW); Fu-Ming Chien, Hsinchu (TW); Chien-Ming Chen, Yangmei Township, Taoyuan County (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 33 days.

(21) Appl. No.: 13/708,460

(22) Filed: Dec. 7, 2012

(65) Prior Publication Data

US 2014/0005299 A1  Jan. 2, 2014

(30) Foreign Application Priority Data

Jun. 27, 2012 (TW) .............................. 101122930 A

(51) Int. Cl.
| | |
|---|---|
| C08L 3/00 | (2006.01) |
| C08L 55/02 | (2006.01) |
| C08L 67/00 | (2006.01) |
| C08L 69/00 | (2006.01) |
| C08K 5/053 | (2006.01) |
| C08K 5/5357 | (2006.01) |
| C09K 21/12 | (2006.01) |
| C08L 47/00 | (2006.01) |
| C08K 13/02 | (2006.01) |
| C08L 67/02 | (2006.01) |
| C08L 3/02 | (2006.01) |
| C08L 3/06 | (2006.01) |
| C08L 3/08 | (2006.01) |

(52) U.S. Cl.
CPC .............. *C08L 69/00* (2013.01); *C08K 5/5357* (2013.01); *C08K 13/02* (2013.01); *C08L 3/02* (2013.01); *C08L 47/00* (2013.01); *C08L 55/02* (2013.01); *C08L 67/02* (2013.01); *C09K 21/12* (2013.01); *C08L 3/06* (2013.01); *C08L 3/08* (2013.01); *C08L 2201/02* (2013.01)

(58) Field of Classification Search
CPC ....... C08L 3/00; C08L 2201/02; C08L 69/00; C08L 67/00; C08L 55/02; C08K 5/5333; C08K 5/053
USPC ........................................... 524/47, 117, 119
See application file for complete search history.

(56) References Cited

U.S. PATENT DOCUMENTS

| | | | | |
|---|---|---|---|---|
| 3,789,091 | A * | 1/1974 | Anderson et al. | 558/77 |
| 3,849,368 | A * | 11/1974 | Anderson et al. | 24/119 |
| 4,397,759 | A * | 8/1983 | Hancock | 252/609 |
| 4,405,731 | A | 9/1983 | Carter, Jr. | |
| 5,126,387 | A * | 6/1992 | Hand | 524/118 |
| 5,710,305 | A * | 1/1998 | Archer et al. | 558/77 |
| 5,773,495 | A * | 6/1998 | Haschke et al. | 524/52 |
| 5,852,114 | A * | 12/1998 | Loomis et al. | 525/57 |
| 5,859,147 | A * | 1/1999 | Dalla Torre et al. | 525/400 |
| 6,153,677 | A * | 11/2000 | Dalla Torre et al. | 524/117 |
| 6,235,815 | B1 * | 5/2001 | Loercks et al. | 524/47 |
| 6,306,941 | B1 * | 10/2001 | Klatt et al. | 524/119 |
| 6,313,105 | B1 | 11/2001 | Bengs et al. | |
| 6,605,657 | B1 | 8/2003 | Favis et al. | |
| 6,962,950 | B1 * | 11/2005 | Bastioli et al. | 524/47 |
| 7,067,076 | B2 * | 6/2006 | Wo et al. | 252/609 |
| 7,094,817 | B2 | 8/2006 | Halley et al. | |
| 7,241,838 | B2 | 7/2007 | Shelby et al. | |
| 7,495,044 | B2 | 2/2009 | Long et al. | |
| 7,772,303 | B2 * | 8/2010 | Hong et al. | 524/99 |

(Continued)

FOREIGN PATENT DOCUMENTS

| | | |
|---|---|---|
| CN | 101386703 A | 3/2009 |
| CN | 101851353 | 10/2010 |

(Continued)

OTHER PUBLICATIONS

Machine translation of JP 2009-029897, 2015.*

(Continued)

*Primary Examiner* — Liam J Heincer
(74) *Attorney, Agent, or Firm* — Muncy, Geissler, Olds & Lowe, P.C.

(57) ABSTRACT

In one embodiment, A flame-retardant thermoplastic starch material, including (A1) 100 parts by weight of starch; (A2) 5 to 75 parts by weight of plasticizer; and (A3) 5 to 30 parts by weight of organic phosphonate flame-retardant, wherein the organic phosphonate flame-retardant has the following formula (I):

$$(R_1O)_n - \underset{R_2}{\overset{O}{\underset{\|}{P}}} - (O - X \underset{O}{\overset{O}{\diagdown}} \overset{O}{\underset{\|}{P}} - CH_3)_{2-n} \quad (I)$$

wherein X is a trivalent aliphatic hydrocarbon radical containing 3 to 12 carbon atoms; $R_1$ and $R_2$ are independently $C_1$ to $C_8$ alkyl; and n is 0 or 1.

7 Claims, No Drawings

(56) References Cited

U.S. PATENT DOCUMENTS

| | | | |
|---|---|---|---|
| 7,786,210 B2* | 8/2010 | Uradnisheck et al. | 524/599 |
| 7,998,888 B2 | 8/2011 | Shi et al. | |
| 8,278,375 B2* | 10/2012 | Schanen et al. | 524/123 |
| 2001/0039303 A1* | 11/2001 | Loercks et al. | 524/47 |
| 2003/0109605 A1* | 6/2003 | Bond et al. | 524/47 |
| 2003/0109650 A1* | 6/2003 | Campbell et al. | 525/461 |
| 2003/0159788 A1* | 8/2003 | Porter et al. | 162/175 |
| 2004/0097662 A1* | 5/2004 | Gaggar et al. | 525/469 |
| 2004/0122135 A1* | 6/2004 | Halley et al. | 524/47 |
| 2004/0197554 A1* | 10/2004 | Bond et al. | 428/359 |
| 2004/0242803 A1* | 12/2004 | Ohme et al. | 525/400 |
| 2005/0009965 A1 | 1/2005 | Schell et al. | |
| 2005/0038144 A1* | 2/2005 | Wo et al. | 524/115 |
| 2005/0079785 A1* | 4/2005 | Bond et al. | 442/327 |
| 2005/0130275 A1 | 6/2005 | Lee et al. | |
| 2007/0088113 A1* | 4/2007 | Suzuki et al. | 524/404 |
| 2008/0287592 A1* | 11/2008 | Favis et al. | 524/500 |
| 2009/0018237 A1* | 1/2009 | Fujii et al. | 523/201 |
| 2009/0043047 A1* | 2/2009 | Ha et al. | 525/77 |
| 2009/0160095 A1* | 6/2009 | Narayan et al. | 264/331.21 |
| 2009/0176938 A1* | 7/2009 | Xu et al. | 525/190 |
| 2010/0003434 A1* | 1/2010 | Bastioli et al. | 428/35.2 |
| 2010/0168284 A1* | 7/2010 | Gaggar et al. | 524/14 |
| 2010/0197834 A1* | 8/2010 | Suzuki et al. | 524/53 |
| 2010/0249293 A1* | 9/2010 | Treece et al. | 524/140 |
| 2010/0305271 A1* | 12/2010 | Mentink et al. | 525/54.26 |
| 2010/0311874 A1* | 12/2010 | Mentink et al. | 524/48 |
| 2010/0311905 A1* | 12/2010 | Mentink et al. | 525/54.31 |
| 2011/0065616 A1* | 3/2011 | Lourdin et al. | 508/216 |
| 2011/0086951 A1* | 4/2011 | Gaggar et al. | 524/82 |
| 2011/0152461 A1* | 6/2011 | Lee et al. | 525/228 |
| 2011/0213055 A1* | 9/2011 | Gohil et al. | 524/47 |
| 2012/0059097 A1 | 3/2012 | Liao et al. | |
| 2012/0123025 A1* | 5/2012 | Schanen et al. | 523/451 |
| 2012/0157630 A1* | 6/2012 | Navarro et al. | 525/67 |
| 2012/0220687 A1* | 8/2012 | Bastioli et al. | 523/100 |
| 2012/0299211 A1* | 11/2012 | Bond et al. | 264/171.12 |
| 2013/0116382 A1* | 5/2013 | Kisin et al. | 525/133 |
| 2013/0231421 A1* | 9/2013 | Liao et al. | 524/47 |
| 2013/0261234 A1* | 10/2013 | Ma | 524/126 |

FOREIGN PATENT DOCUMENTS

| | | |
|---|---|---|
| EP | 0535994 | 4/1993 |
| EP | 0596437 | 5/1994 |
| EP | 0704495 | 4/1996 |
| EP | 2094779 | 9/2009 |
| JP | 2000-103970 | 4/2000 |
| JP | 2004-002613 | 1/2004 |
| JP | 2007-175808 | 7/2007 |
| JP | 2007-204656 | 8/2007 |
| JP | 2009-029897 | 2/2009 |
| JP | 2009-062450 | 3/2009 |
| JP | 2009-286933 | 12/2009 |
| TW | 328544 | 3/1998 |
| TW | I283167 | 7/2007 |
| TW | 200846406 | 12/2008 |
| TW | 201211139 A1 | 3/2012 |
| WO | WO2009103856 | 8/2009 |
| WO | WO2010012041 | 2/2010 |

OTHER PUBLICATIONS

Taiwan Office Action for Taiwan Application No. 101122930 dated Jan. 8, 2014.

Nie, "Intumescent Flame Retardation of Starch Containing Polypropylene Semibiocomposites: Flame Retardancy and Thermal Degradation", Ind. Eng. Chem. Res., 2009, pp. 10751-10758.

Reti, "Flammability Properties of Intumescent PLA Including Starch and Lignin", Polymers for Advanced Technologies, 2008, pp. 628-635.

Wu, "Flame Retardancy and Thermal Degradation of Intumescent Flame Retardant Starch-Based Biodegradable Composites", Ind. End. Chem. Res., 2009, pp. 3150-3157.

Matko, "Flame Retardancy of Biodegradable Polymers and Biocomposites", Polymer Degradation and Stability, 2005, pp. 138-145, vol. 88.

Wittek, "Mechanical Properties and Fire Retardancy of Bidirectional Reinforced Composite Based on Biodegradable Starch Resin and Basalt Fibres", eXPRESS Polymer Letters, 2008, pp. 810-822, vol. 2, No. 11.

Chinese Office action from cooresponding Chinese Application No. 201210270266.9. mailed on Apr. 27, 2015, 10 pages.

* cited by examiner

FLAME-RETARDANT THERMOPLASTIC STARCH MATERIAL, FLAME-RETARDANT THERMOPLASTIC STARCH-BASED BIO-COMPOSITE, AND METHOD FOR MANUFACTURING THE SAME

CROSS REFERENCE TO RELATED APPLICATIONS

This Application claims priority of Taiwan Patent Application No. 101122930, filed on Jun. 27, 2012, the entirety of which is incorporated by reference herein.

TECHNICAL FIELD

The technical field relates to a flame-retardant thermoplastic starch material, a flame-retardant thermoplastic starch-based bio-composite, and a method for manufacturing the same.

BACKGROUND

In general, plants store energy in starch, and the starch may be stored in grain, beans, tubers, or the like. Since these natural sources of starch are cheap and abundant all over the earth, it has been applied to various industrial applications, including the food, paper, textile, and glue industries. Native starch refers to partially crystallized nano-level particles. Hydrogen bonds between these particles make them assemble with each other to become a huge assembly. Therefore, it is difficult for the native starch to be used in a melting process. Conventionally, starch is often used as filler in plastics to decrease cost and increase rigidity.

The hydrogen bonds between starch particles may be broken by adding polyol into the starch. The polyol may be glycerol, sorbitol, or polyethylene oxide (PEO), for example. As a result, the molecular chain entanglement and chain motion of the starch can reach a point where the starch develops characteristics of thermoplasticity. Thus, the thermoplastic starch may have a mobility similar to that of other synthesized polymers, and therefore it may be suitable for use in molding and extruding the thermoplastic. However, pure thermoplastic starch has poor mechanical strength, resulting in limited applications. Therefore, a mixture of thermoplastic starch and a biodegradable polymer, or a mixture of thermoplastic starch and polyolefin may be used.

In Taiwan, over 1.5 million tons of plastic material is used every year. If all this plastic material could be replaced with an eco-friendly material (biomass content 25%), consumption of the petroleum-based material could be reduced by about 400,000 tons per year.

In addition, in some applications such as automobile interiors, domestic electrical devices, or electronic products, the plastic material needs to be flame-retardant. However, since thermoplastic starch itself is inflammable and exhibits melt-dripping behavior, it is very difficult to develop a flame-retardant starch-based bio-composite. Thus, petrol materials with high impact resistance, such as polystyrene, acrylonitrile butadiene styrene (ABS), polycarbonate (PC)/ABS, are still the most commonly used plastic materials.

Therefore, a novel thermoplastic starch and bio-composite with flame-retardant properties is required.

SUMMARY

A detailed description is given in the following embodiments with reference to the accompanying drawings.

In one embodiment, a flame-retardant thermoplastic starch material is provided, comprising: (A1) 100 parts by weight of starch; (A2) 5 to 75 parts by weight of plasticizer; and (A3) 5 to 30 parts by weight of organic phosphonate flame-retardant, wherein the organic phosphonate flame-retardant has the following formula (I):

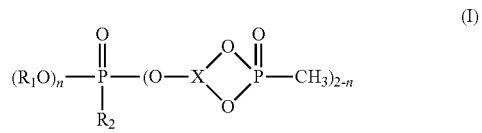

wherein X is a trivalent aliphatic hydrocarbon radical containing 3 to 12 carbon atoms; $R_1$ and $R_2$ are independently $C_1$ to $C_8$ alkyl; and n is 0 or 1.

In another embodiment, a flame-retardant thermoplastic starch-based bio-composite is provided, comprising: (A) 5 to 40 parts by weight of the flame-retardant thermoplastic starch material as described previously; (B) 60 to 90 parts by weight of thermoplastic polymer; and (C) 3 to 10 parts by weight of impact modifier.

In still another embodiment, a method for manufacturing a flame-retardant thermoplastic starch-based bio-composite is provided, comprising: mixing (A1) 100 parts by weight of starch, (A2) 5 to 75 parts by weight of plasticizer, and (A3) 5 to 30 parts by weight of organic phosphonate flame-retardant and performing a roll mill plasticizing process to form a flame-retardant thermoplastic starch (A), wherein the organic phosphonate flame-retardant has the following formula (I):

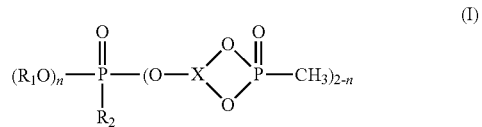

wherein X is a trivalent aliphatic hydrocarbon radical containing 3 to 12 carbon atoms, $R_1$ and $R_2$ are independently $C_1$ to $C_8$ alkyl; and n is 0 or 1; and performing a blending process to (A) 5 to 40 parts by weight of the flame-retardant thermoplastic starch, (B) 60 to 90 parts by weight of thermoplastic polymer, and (C) 3 to 10 parts by weight of impact modifier to form a flame-retardant thermoplastic starch-based bio-composite.

DETAILED DESCRIPTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

Moreover, the formation of a first feature over or on a second feature in the description that follows may include embodiments in which the first and second features are formed in direct contact, and may also include embodiments in which additional features may be formed between the first and second features, such that the first and second features may not be in direct contact.

In one embodiment, a flame-retardant thermoplastic starch material is provided. The flame-retardant thermoplastic starch material comprises (A1) 100 parts by weight of starch;

(A2) 5 to 75 parts by weight of plasticizer; and (A3) 5 to 30 parts by weight of organic phosphonate flame-retardant. In another embodiment, the flame-retardant thermoplastic starch material comprises (A1) 100 parts by weight of starch; (A2) 20 to 45 parts by weight of plasticizer; and (A3) 10 to 20 parts by weight of organic phosphonate flame-retardant.

Examples of the starch (A1) may include, but are not limited to, corn starch, cassava starch, potato starch, esterified starch, etherified starch, or combinations thereof. Examples of the plasticizer (A2) may include, but are not limited to, water, polyol, or combinations thereof. Examples of the polyol may include, but are not limited to, glycerol, sorbitol, polyethylene oxide (PEO), or the like. The polyol may break hydrogen bonds between starch molecules such that the starch molecules, which have chain entanglement and chain motion, may reach a better thermoplastic ability.

The organic phosphonate flame-retardant (A3) may have the following formula (I):

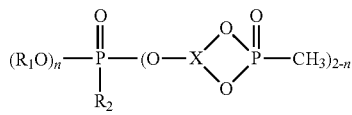

(I)

wherein X is a trivalent aliphatic hydrocarbon radical containing 3 to 12 carbon atoms; $R_1$ and $R_2$ are independently $C_1$ to $C_8$ alkyl; and n is 0 or 1. In one embodiment, the trivalent aliphatic hydrocarbon radical has the following formula (II):

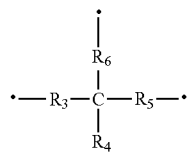

(II)

wherein $R_3$ is $C_1$ to $C_8$ alkylene or a single bond; $R_4$ is $C_1$ to $C_3$ alkyl or hydrogen; and R5 and R6 are independently $C_1$ to $C_5$ alkylene. Table 1 illustrates some examples of the trivalent aliphatic hydrocarbon radical in this disclosure. However, these structures are, of course, merely examples and are not intended to be limiting.

TABLE 1

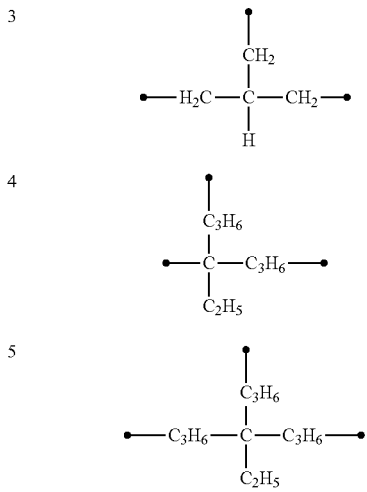

TABLE 1-continued

3

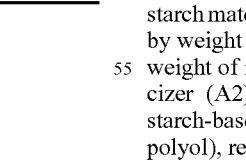

4

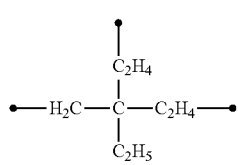

5

(structure with $C_3H_6$ groups)

In one embodiment, the organic phosphonate flame-retardant (A3) is a liquid. Therefore, it can be miscible with water/glycerol, such that they can be evenly mixed with the starch.

In another embodiment, a method for manufacturing a flame-retardant thermoplastic starch-based bio-composite is provided. In the method for manufacturing a flame-retardant thermoplastic starch-based bio-composite, (A1) 100 parts by weight of starch, (A2) 5 to 75 parts by weight of plasticizer, and (A3) 5 to 30 parts by weight of organic phosphonate flame-retardant are first mixed and a roll mill plasticizing process is performed to form a flame-retardant thermoplastic starch (A) at 60° C. to 100° C. In another embodiment, the roll mill plasticizing process is performed at 70° C. to 90° C.

Next, a blending process is performed to (A) 5 to 40 parts by weight of the flame-retardant thermoplastic starch as described above, (B) 60 to 90 parts by weight of thermoplastic polymer, and (C) 3 to 10 parts by weight of impact modifier to form a flame-retardant thermoplastic starch-based bio-composite. In one embodiment, the blending process is performed at 170° C. to 260° C. In another embodiment, the blending process is performed at 190° C. to 240° C.

The resulting flame-retardant thermoplastic starch-based bio-composite may comprise (A) 5 to 40 parts by weight of the flame-retardant thermoplastic starch material (FR-thermoplastic starch); (B) 60 to 90 parts by weight of thermoplastic polymer; and (C) 3 to 10 parts by weight of impact modifier. In another embodiment, the flame-retardant thermoplastic starch-based bio-composite may comprise (A) 5 to 40 parts by weight of the flame-retardant thermoplastic starch material (FR—thermoplastic starch); (B) 70 to 85 parts by weight of thermoplastic polymer; and (C) 5 to 7 parts by weight of impact modifier. It should be noted that the plasticizer (A2) in the resulting flame-retardant thermoplastic starch-based bio-composite does not contain water (only polyol), resulting from the process performed at a high temperature that removes all the water in the plasticizer (A2).

Examples of the thermoplastic polymer (B) may include, but are not limited to, polycarbonate (PC), acrylonitrile butadiene styrene (ABS), polybutylene terephthalate (PBT), or combinations thereof. In addition, the polycarbonate, which has a shorter carbon chain than ABS and PBT (ABS and PBT are more inflammable than PC), may have a better miscibility with the flame-retardant thermoplastic starch. A blending temperature in the embodiment may be at least 200° C. It is noted that conventional flame-retardant may start to react and/or decompose at this high temperature, and therefore the conventional flame-retardant may not be used in this composite system. In addition, according to various embodiments, the flame-retardant thermoplastic starch is added into polycarbonate, and impact modifier which is compatible with the starch is also added into the mixture. Therefore, the toughness (impact resistance) of the composite material may be improved, and its flame-retardant properties may achieve a rating to UL-94V0 level, resulting from its compatibility and optimization by adjusting its composition.

In one embodiment, the impact modifier (C) is a rubber system having a core-shell structure. The shell portion of the rubber system may be polymethylmethacrylate (PMMA). The shell portion may improve its miscibility with the thermoplastic polymer and fix the size of the impact modifier. The core portion of the rubber system may comprise acrylic rubber, silicone-acrylic rubber, or combinations thereof. The core portion may provide the toughness (impact resistance) of the material.

It is noted that in the present disclosure, the organic phosphonate flame-retardant (A3) is first mixed and plasticized with starch, and then a blending process is performed afterwards. However, in some other research, the flame-retardant is added into the polymer matrix directly (rather than being plasticized first). In this case, the flame-retardant thermoplastic starch (which has flame-retardant properties itself) can not be formed.

In addition, since conventional thermoplastic starch contains a great amount of polyol, the starch-based bio-composite forming therefrom is usually inflammable and has melt dripping characteristics. However, in various embodiments of the disclosure, some of the polyol is replaced by the flame-retardant when the thermoplastic starch with flame-retardant properties is formed. Therefore, the amount of the plasticizer used may be decreased, and a bio-composite with flame-retardant properties may be formed.

The flame-retardant thermoplastic starch-based bio-composite in various embodiments has high workability at high temperatures, good molding ability and mechanical strength, and flame-retarding properties. Therefore, the flame-retardant thermoplastic starch-based bio-composite may be used in automobile interiors, domestic electrical devices, or electronic products.

Examples 1-17

In examples 1 to 17, the flame-retardant thermoplastic starch-based bio-composites were formed. The composition and material used in different examples are illustrated in Tables 2 to 5.

100 parts by weight of starch, 30 to 70 parts by weight of water, 5 to 30 parts by weight of glycerol, and 5 to 30 parts by weight of flame-retardant were mixed according to the composition shown in Tables 2 and 4. The flame-retardant included Chemguard-1045 (ORGANIC PHOSPHONATE; CG-1045; Chembridge International Corp.; as shown below), triphenyl phosphate (TPP), phosphate base flame-retardant (Resorcinol bis(dixylenyl phosphate); PX-200), or combinations thereof.

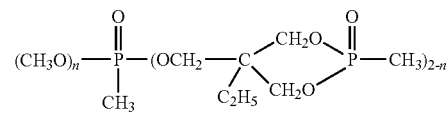

Chemguard-1045 (CG-1045)

wherein n is 1.

Then, the mixture described above was put into a roll mill machine. The roll mill process was performed at 60° C. to 100° C. for 30 minutes to 80 minutes to plasticize the material. A granulator was then used to form a flame-retardant thermoplastic starch.

A blending process was performed to (A) 5 to 40 parts by weight of the resulting flame-retardant thermoplastic starch, (B) 60 to 90 parts by weight of PC, ABS, or PBT, and (C) 3 to 10 parts by weight of impact modifier, according to the composition shown in Tables 3 and 5. The process continued for 1 minute to 5 minutes at 170° C. to 260° C. to form the flame-retardant thermoplastic starch-based bio-composite.

Comparative Example 1

The flame-retardant thermoplastic starch-based bio-composite in comparative example 1 was formed using the following method. The composition and material used in different examples are illustrated in Tables 4 and 5.

100 parts by weight of starch, 50 parts by weight of water, and 5 parts by weight of glycerol were mixed. Then, the mixture was put into a roll mill machine. The roll mill process was performed at 80° C. for 30 minutes to plasticize the material. A granulator was then used to form a thermoplastic starch.

A blending process was performed to (A) 30 parts by weight of the resulting thermoplastic starch, (B) 70 parts by weight of PC, (C) 10 parts by weight of organic phosphonate flame-retardant (ORGANIC PHOSPHONATE; Chembridge International Corp), and (D) 5 parts by weight of impact modifier. The process continued for 2 minutes at 230° C. to form the flame-retardant thermoplastic starch-based bio-composite.

Comparative Example 2

The flame-retardant thermoplastic starch-based bio-composite in comparative example 2 was formed using the following method. The composition and material used in different examples are illustrated in Tables 4 and 5.

100 parts by weight of starch, 50 parts by weight of water, and 10 parts by weight of glycerol were mixed. Then, the mixture was put into a roll mill machine. The roll mill process was performed at 80° C. for 30 minutes to plasticize the material. A granulator was then used to form a thermoplastic starch.

A blending process was performed to (A) 30 parts by weight of the resulting thermoplastic starch, (B) 70 parts by weight of PC, (C) 15 parts by weight of organic phosphonate flame-retardant (PX-200), and (D) 5 parts by weight of impact modifier. The process continued for 2 minutes at 230° C. to form the flame-retardant thermoplastic starch-based bio-composite.

Comparative Example 3

The flame-retardant thermoplastic starch-based bio-composite in comparative example 3 was formed using the following method. The composition and material used in different examples are illustrated in Tables 4 and 5.

100 parts by weight of starch, 50 parts by weight of water, and 10 parts by weight of flame-retardant (9,10-dihydro-9-oxa-10-phosphaphenan-threne-10-oxide; DOPO) were mixed. Then, the mixture was put into a roll mill machine. The roll mill process was performed at 80° C. for 30 minutes to plasticize the material. A granulator was then used to form a thermoplastic starch.

A blending process was performed to (A) 20 parts by weight of the resulting thermoplastic starch, (B) 80 parts by weight of PC, and (C) 5 parts by weight of impact modifier. The process continued for 2 minutes at 230° C. to form the flame-retardant thermoplastic starch-based bio-composite.

Comparative Example 4

The flame-retardant thermoplastic starch-based bio-composite in comparative example 4 was formed using the following method. The composition and material used in different examples are illustrated in Tables 4 and 5.

100 parts by weight of starch, 50 parts by weight of water, and 10 parts by weight of glycerol were mixed. Then, the mixture was put into a roll mill machine. The roll mill process was performed at 80° C. for 30 minutes to plasticize the material. A granulator was then used to form a thermoplastic starch.

A blending process was performed to (A) 10 parts by weight of the resulting thermoplastic starch, (B) 90 parts by weight of PC, (C) 5 parts by weight of DOPO and 10 parts by weight of CG-1045, and (D) 5 parts by weight of impact modifier. The process continued for 2 minutes at 230° C. to form the flame-retardant thermoplastic starch-based bio-composite.

TABLE 2

Forming flame-retardant thermoplastic starch in examples 1-10

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Starch | | | | | | | | | | |
| Corn starch | 100 | 100 | 100 | 0 | 0 | 0 | 0 | 0 | 0 | 100 |
| Cassava starch | 0 | 0 | 0 | 100 | 100 | 100 | 0 | 0 | 0 | 0 |
| Potato starch | 0 | 0 | 0 | 0 | 0 | 0 | 100 | 100 | 100 | 0 |
| Water | 50 | 50 | 50 | 50 | 50 | 50 | 40 | 50 | 60 | 50 |
| Glycerol | 5 | 10 | 15 | 10 | 10 | 10 | 10 | 10 | 10 | 10 |
| Flame-retardant | | | | | | | | | | |
| CG-1045 | 15 | 15 | 20 | 15 | 15 | 15 | 15 | 15 | 15 | 15 |
| TPP | 0 | 0 | 0 | 5 | 10 | 10 | 0 | 0 | 0 | 0 |
| PX-200 | 0 | 0 | 0 | 0 | 0 | 0 | 5 | 10 | 15 | 0 |
| TPS flame-retardant test | | | | | | | | | | |
| UV-94 | V0 | V0 | V0 | V0 | V0 | V0 | V0 | V0 | V0 | V0 |

* Above values illustrate the composition of each material used during the manufacturing process (Unit: parts by weight)

TABLE 3

Forming flame-retardant thermoplastic starch-based bio-composite in examples 1-10

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Thermoplastic polymer | | | | | | | | | | |
| PC | 70 | 70 | 70 | 80 | 80 | 80 | 80 | 80 | 80 | 65 |
| PBT | 0 | 0 | 0 | 0 | 0 | 0 | 0 | 0 | 0 | 5 |
| Thermoplastic starch | | | | | | | | | | |
| Thermoplastic corn starch | 30 | 30 | 30 | 0 | 0 | 0 | 0 | 0 | 0 | 30 |
| Thermoplastic cassava starch | 0 | 0 | 0 | 20 | 20 | 20 | 0 | 0 | 0 | 0 |
| Thermoplastic potato starch | 0 | 0 | 0 | 0 | 0 | 0 | 20 | 20 | 20 | 0 |
| Impact modifier | | | | | | | | | | |
| Acrylic rubber | 5 | 5 | 3 | 5 | 7 | 10 | 0 | 0 | 0 | 3 |
| Silicone-acrylic rubber | 0 | 0 | 0 | 0 | 0 | 0 | 5 | 5 | 5 | 0 |
| Flame-retardant | | | | | | | | | | |
| PX-200 | 0 | 0 | 0 | 0 | 0 | 0 | 0 | 0 | 0 | 0 |
| CG-1045 | 0 | 0 | 0 | 0 | 0 | 0 | 0 | 0 | 0 | 0 |

* Above values illustrate the composition of each material used during the manufacturing process (Unit: parts by weight)

TABLE 4

Forming thermoplastic starch in examples 11-17 and comparative examples 1-4

|  | Example 11 | Example 12 | Example 13 | Example 14 | Example 15 | Example 16 | Example 17 | Comparative Example 1 | Comparative Example 2 | Comparative Example 3 | Comparative Example 4 |
|---|---|---|---|---|---|---|---|---|---|---|---|
| Starch | | | | | | | | | | | |
| Corn starch | 100 | 100 | 100 | 100 | 100 | 100 | 100 | 100 | 0 | 0 | 0 |
| Cassava starch | 0 | 0 | 0 | 0 | 0 | 0 | 0 | 0 | 100 | 0 | 0 |
| Potato starch | 0 | 0 | 0 | 0 | 0 | 0 | 0 | 0 | 0 | 0 | 0 |
| Esterified starch | 0 | 0 | 0 | 0 | 0 | 0 | 0 | 0 | 0 | 0 | 0 |
| Etherified starch | 0 | 0 | 0 | 0 | 0 | 0 | 0 | 0 | 0 | 100 | 100 |
| Water | 50 | 50 | 50 | 50 | 50 | 50 | 50 | 50 | 50 | 50 | |
| Glycerol | 10 | 10 | 10 | 10 | 10 | 10 | 10 | 10 | 10 | 10 | 50 |
| Flame-retardant | | | | | | | | | | | |
| CG-1045 | 10 | 20 | 15 | 15 | 20 | 20 | 20 | 0 | 0 | 0 | 10 |
| TPP | 0 | 0 | 0 | 0 | 0 | 0 | 0 | 0 | 0 | 0 | 0 |
| PX-200 | 0 | 0 | 0 | 0 | 0 | 0 | 0 | 0 | 0 | 0 | 0 |
| DOPO | 0 | 0 | 0 | 0 | 0 | 0 | 0 | 0 | 0 | 10 | 0 |

* Above values illustrate the composition of each material used during the manufacturing process (Unit: parts by weight)

TABLE 5

Forming flame-retardant thermoplastic starch-based bio-composite in examples 11-17 and comparative examples 1-4

|  | Example 11 | Example 12 | Example 13 | Example 14 | Example 15 | Example 16 | Example 17 | Comparative Example 1 | Comparative Example 2 | Comparative Example 3 | Comparative Example 4 |
|---|---|---|---|---|---|---|---|---|---|---|---|
| Thermoplastic polymer | | | | | | | | | | | |
| PC | 60 | 50 | 65 | 65 | 65 | 65 | 65 | 70 | 70 | 80 | 90 |
| PBT | 10 | 20 | 0 | 0 | 0 | 0 | 0 | 0 | 0 | 0 | 0 |
| ABS | 0 | 0 | 5 | 10 | 5 | 5 | 10 | 0 | 0 | 0 | 0 |
| Thermoplastic starch | | | | | | | | | | | |
| Thermoplastic corn starch | 30 | 30 | 30 | 30 | 30 | 30 | 30 | 30 | 0 | 0 | 0 |
| Thermoplastic cassava starch | 0 | 0 | 0 | 0 | 0 | 0 | 0 | 0 | 30 | 0 | 0 |
| Thermoplastic potato starch | 0 | 0 | 0 | 0 | 0 | 0 | 0 | 0 | 0 | 0 | 10 |
| Thermoplastic esterified starch | 0 | 0 | 0 | 0 | 0 | 0 | 0 | 0 | 0 | 20 | 0 |
| Thermoplastic etherified starch | 0 | 0 | 0 | 0 | 0 | 0 | 0 | 0 | 0 | 0 | 0 |
| Impact modifier | | | | | | | | | | | |
| Acrylic rubber | 3 | 3 | 3 | 3 | 3 | 3 | 3 | 5 | 5 | 5 | 5 |
| Flame-retardant | | | | | | | | | | | |
| PX-200 | 0 | 0 | 0 | 0 | 0 | 0 | 0 | 0 | 15 | 0 | 10 |
| CG-1045 | 0 | 0 | 0 | 0 | 0 | 0 | 0 | 10 | 0 | 0 | 5 |

* Above values illustrate the composition of each material used during the manufacturing process (Unit: parts by weight)

Workability

Tables 6 and 7 further illustrate the workability of the resulting flame-retardant thermoplastic starch-based bio-composite in examples 1-17 and comparative examples 1-4. In examples 1 to 17, during the preparation of thermoplastic starch, some polyol was replaced with organic phosphate flame-retardant. Therefore, the polymer was added to the thermoplastic starch to perform a blending process after the flame-retardant was plasticized with the starch. On the other hand, in comparative examples 1, 2, and 4, the flame-retardant was added directly into the composite to form a starch-based bio-composite. In comparative example 3, DOPO was used as the flame-retardant, and the resulting starch-based bio-composite had poor melting ability and was difficult to extrude. Accordingly, the flame-retardant thermoplastic starch-based bio-composite in the examples had better workability than those in the comparative examples.

During the manufacturing process, the flame-retardant thermoplastic starch-based bio-composite in these examples required less plasticizer. In addition, they were workable at higher temperatures and had a better molding ability, mechanical strength, and flame-retardant properties. Thus, they represent an eco-friendly material which might be used in automobile interiors, domestic electrical devices, or electronic products.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

(A3) 5 to 30 parts by weight of organic phosphonate flame-retardant, wherein the organic phosphonate flame-retardant has the following formula (I):

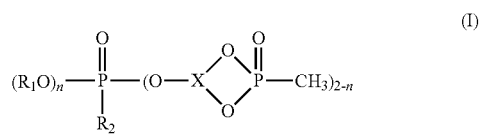

TABLE 6

Characteristics of the resulting flame-retardant thermoplastic starch-based bio-composite in examples 1-10

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Workability | ○ | ○ | ○ | ○ | ○ | ○ | ○ | ○ | ○ | ○ |
| Flame-retardant UL-94 | V-0 | V-1 | V-0 | V-1 | V-1 | V-1 | V-1 | V-1 | V-1 | V-0 |
| Impact resistance (kgf-cm/cm) | 6.48 | 6.87 | 4.86 | 7.68 | 14.24 | 15.82 | 12.56 | 8.44 | 7.86 | 3.35 |
| Flexural modulus (kg/cm$^2$) | 29100 | 27704 | 29572 | 27292 | 25738 | 24382 | 25292 | 26380 | 26654 |  |
| Heat deflection temperature (° C./264 psi) | 108 | 106 | 109 | 109 | 110 | 109 | 109 | 110 | 108 | 108 |

* Workability valuation:
○: capable of extruding and injection molding;
Δ: poor melting ability, difficult to extrude;
X: not able to extrude

TABLE 7

Characteristics of the resulting flame-retardant thermoplastic starch-based bio-composite in examples 11-17 and comparative examples 1-4

|  | Example 11 | Example 12 | Example 13 | Example 14 | Example 15 | Example 16 | Example 17 | Comparative Example 1 | Comparative Example 2 | Comparative Example 3 | Comparative Example 4 |
|---|---|---|---|---|---|---|---|---|---|---|---|
| Workability | ○ | ○ | ○ | ○ | ○ | ○ | ○ | X | Δ | X | Δ |
| Flame-retardant UL-94 | V-1 | V-1 | V-2 | V-2 | V-0 | V-0 | V-1 |  | V-2 |  | V-2 |
| Impact resistance (kgf-cm/cm) | 2.83 | 2.30 | 3.61 | 4.14 | 3.23 | 3.25 | 3.06 |  | 2.27 |  | 2.73 |
| Heat deflection temperature (° C./264 psi) | 100 | 93 | 110 | 107 | 101 | 101 | 94 |  | 82 |  | 97 |

* Workability valuation:
○: capable of extruding and injection molding;
Δ: poor melting ability, difficult to extrude;
X: not able to extrude

What is claimed is:

1. A flame-retardant thermoplastic starch-based bio-composite, comprising:
   (A) 5 to 40 parts by weight of a flame-retardant thermoplastic starch material, wherein the flame-retardant thermoplastic starch material comprises
      (A1) 100 parts by weight of starch;
      (A2) 5 to 15 parts by weight of polyol; and
      (A3) 5 to 30 parts by weight of organic phosphonate flame-retardant, wherein the organic phosphonate flame-retardant has the following formula (I):

wherein X is a trivalent aliphatic hydrocarbon radical containing 3 to 12 carbon atoms; $R_1$ and $R_7$ are independently $C_1$ to $C_8$ alkyl; and n is 0 or 1;
   (B) 60 to 90 parts by weight of thermoplastic polymer, wherein the thermoplastic polymer comprises polycarbonate (PC), acrylonitrile butadiene styrene (ABS), polybutylene terephthalate (PBT), or combinations thereof; and (C) 3 to 10 parts by weight of impact modifier, wherein the impact modifier is a rubber system having a core-shell structure, and a shell portion of the rubber system is polymethylmethacrylate (PMMA), and a core portion of the rubber system comprises acrylic rubber, silicone-acrylic rubber, or combinations thereof.

2. The flame-retardant thermoplastic starch-based bio-composite as claimed in claim 1, wherein the flame-retardant thermoplastic starch-based bio-composite is used in automobile interiors, domestic electrical devices, or electronic products.

3. A method for manufacturing a flame-retardant thermoplastic starch-based bio-composite, comprising:
  mixing (A1) 100 parts by weight of starch, (A2) 5 to 75 parts by weight of polyol, and
  (A3) 5 to 30 parts by weight of organic phosphonate flame-retardant and performing a roll mill plasticizing process to form a flame-retardant thermoplastic starch (A), wherein the organic phosphonate flame-retardant has the following formula (I):

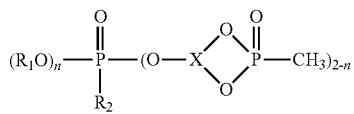

(I)

wherein X is a trivalent aliphatic hydrocarbon radical containing 3 to 12 carbon atoms, $R_1$ and $R_2$ are independently $C_1$ to $C_8$ alkyl; and n is 0 or 1; and performing a blending process to (A) 5 to 40 parts by weight of the flame-retardant thermoplastic starch, (B) 60 to 90 parts by weight of thermoplastic polymer, wherein the thermoplastic polymer comprises polycarbonate (PC), acrylonitrile butadiene styrene (ABS), polybutylene terephthalate (PBT), or combinations thereof, and (C) 3 to 10 parts by weight of impact modifier to form a flame-retardant thermoplastic starch-based bio-composite, wherein the impact modifier is a rubber system having a core-shell structure, and a shell portion of the rubber system is polymethylmethacrylate (PMMA), and a core portion of the rubber system comprises acrylic rubber, silicone-acrylic rubber, or combinations thereof.

4. The method for manufacturing a flame-retardant thermoplastic starch-based bio-composite as claimed in claim 3, wherein the roll mill plasticizing process is performed at 60° C. to 100° C.

5. The method for manufacturing a flame-retardant thermoplastic starch-based bio-composite as claimed in claim 3, wherein the blending process is performed at 170° C. to 260° C.

6. The method for manufacturing a flame-retardant thermoplastic starch-based bio-composite as claimed in claim 3, wherein the plasticizer comprises water, polyol, or combinations thereof.

7. The method for manufacturing a flame-retardant thermoplastic starch-based bio-composite as claimed in claim 3, wherein the starch comprises corn starch, cassava starch, potato starch, esterified starch, etherified starch, or combinations thereof.

* * * * *